United States Patent
Carter et al.

(10) Patent No.: US 6,601,171 B1
(45) Date of Patent: Jul. 29, 2003

(54) DEPUTIZATION IN A DISTRIBUTED COMPUTING SYSTEM

(75) Inventors: Stephen R Carter, Spanish Fork, UT (US); Carlos A Nevarez, Orem, UT (US)

(73) Assignee: Novell, Inc., Provo, UT (US)

(*) Notice: Subject to any disclaimer, the term of this patent is extended or adjusted under 35 U.S.C. 154(b) by 0 days.

(21) Appl. No.: 09/252,435

(22) Filed: Feb. 18, 1999

(51) Int. Cl.[7] .............................. H04L 9/30; H04L 9/28; H04L 12/28
(52) U.S. Cl. ...................... 713/175; 713/175; 713/156; 713/157; 713/173; 713/201; 380/23; 380/25; 380/30
(58) Field of Search ................................. 713/156, 157, 713/173, 201; 380/30, 23, 25; 709/225, 226, 229

(56) References Cited

U.S. PATENT DOCUMENTS

| | | | |
|---|---|---|---|
| 5,005,200 A | 4/1991 | Fischer | 380/30 |
| 5,224,163 A | 6/1993 | Gasser et al. | 380/30 |
| 5,349,642 A | 9/1994 | Kingdon | 380/25 |
| 5,649,099 A * | 7/1997 | Theimer et al. | 395/186 |
| 5,659,616 A * | 8/1997 | Sudia | 380/23 |
| 5,687,235 A | 11/1997 | Perlman et al. | 380/25 |
| 5,781,724 A | 7/1998 | Nevarez et al. | 395/186 |
| 5,784,560 A | 7/1998 | Kingdon et al. | 395/200.31 |
| 5,787,175 A | 7/1998 | Carter | 380/25 |
| 5,832,483 A | 11/1998 | Barker | 707/8 |
| 6,189,103 B1 * | 2/2001 | Nevarez et al. | 713/201 |
| 2002/0166049 A1 * | 11/2002 | Sinn | 713/175 |

OTHER PUBLICATIONS

Bruce Schneier, Applied Cryptography, 1996, Second Edition, John Wiley & Sins, Inc., p. 37–39, and 47–48.*
Carl M. Ellison, Home Network security, Intel Technology Journa, vol. 6, ISSSN 1535–766,published Nov. 2002, pp. 37–33.*
Daniel H. Craft, Resource Management in a decentralized system, ACM, Series–Proceeding–Article, Year of Publication: 1983 ISBN:0–89791–115–6, pp. 11–19.*
Bull, J.A. et al., Towards security in an open system federation,Abstract, Computer Security–ESORICS 92. Second European Symosiumin computer security proceedingsNov. 23–35, 1992.*
Roger B. Dannenberg and Peter G. Hibbard, A Butler process for resource sharing on Spice machines, ACM Transaction, vol. No. 3, Jul. 1985, pp. 234–252.*
Commonly owned co–pending U.S. patent application Ser. No. 09/119,896 filed Jul. 21, 1998 for "Authority Delegation with Secure Operating System Queues."
Tanenbaum, *Distributed Operating Systems*, pp. 520–576, 1995.
Bierer et al., *NetWare 4 for Professionals*, pp. 255–276, 1993.

(List continued on next page.)

*Primary Examiner*—Gail Hayes
*Assistant Examiner*—Taghi T. Arani
(74) *Attorney, Agent, or Firm*—Dinsmore & Shohl LLP

(57) ABSTRACT

Methods, signals, devices, and systems are provided for delegating rights in a distributed computer system from a principal to one or more deputies. The deputies have identities separate from the principal. This allows the deputies to persist after the principal logs off the system, and permits deputization across boundaries imposed by namespaces and particular network protocols. A deputy may also delegate rights to additional deputies. Deputization is accomplished using certificates, credentials, public and private keys, process creation, and other tools and techniques.

18 Claims, 5 Drawing Sheets

OTHER PUBLICATIONS

Schneier, *Applied Cryptography*, pp. 273–275, 1994.

RFC 1507, "DASS: Distributed Authentication Security Service", Sep. 1993.

Aura, "On the Structure of Delegation Networks", Jun. 1998.

Aura et al., "Delegation–based access control for intelligent network services", no later than Sep. 21, 1998.

Johnston et al., "Security Architectures for Large–Scale Distributed Collaboratory Environments", no later than Sep. 21, 1998.

"Credential–Based PKI Systems", no later than Dec. 3, 1998.

* cited by examiner

DEPUTIZATION IN A DISTRIBUTED COMPUTING SYSTEM

FIELD OF THE INVENTION

The present invention relates to the delegation of rights in a distributed computing system. More particularly, the present invention relates to delegation through a chain or tree of deputies in the distributed system.

TECHNICAL BACKGROUND OF THE INVENTION

Distributed computing systems are becoming increasingly useful and prevalent. Distributed computers are connected by local area networks, wide area networks, and networks of networks, such as the Internet. These distributed computing systems make available platform-neutral, mobile code environments which contain a growing collection of computational objects, applications, data, and other information in the form of files, databases, images, and/or other named resources.

With the growth of such distributed computing systems and their information content, there is an urgent need to support the efficient and effective delegation of rights across heterogeneous systems, services, and platforms. Powerful and convenient delegation services are needed to achieve seamless distribution of critical resources, and to make the power of computing resources available for more widespread use. Ideally, delegation services help users (both human and digital) put computational tasks to work at times and locations which are appropriate for execution of those tasks and with access to required resources, without creating unacceptable security risks.

Various approaches have been taken to the problem of providing effective and efficient delegation services in a distributed computing system. For instance, a Simple Distributed Security Infrastructure ("SDSI") has been designed to facilitate the construction of secure systems by providing terminology for defining access control lists and security policies. SDSI is also an attempt to move away from identity-based certification and towards a system based on roles and credentials. The SDSI system is key-centric. Rather than attach a public key to an identity, SDSI entities are the keys themselves. That is, SDSI principals are public keys that can make declarations by issuing verifiable signed statements. The statements may be made in the form of certificates which bind identifying information to a principal, assert that a principal does or does not belong to some group, and/or bind a name to a value such as a principal.

The Calypso architecture described by Tuomas Aura and other researchers from Helsinki University of Technology also uses a key-oriented approach. A public cryptographic signature key represents the entity that holds the corresponding private key. Key-oriented certificates are used to delegate rights. Access rights are delegated directly from key to key without explicitly identifying the involved entities by name in the certificates. Delegation is also transitive. That is, if Alice's key authorizes Bob's key to use a service and Bob's key in turn authorizes Charlie's key to use the service, then the system considers that situation to be equivalent to having Alice's key delegate rights directly to Charlie's key.

Although key-centric approaches can be useful, they assume it is not necessary to expressly associate a name (such as a user name or an account number) with a particular act of delegation. However, such associations can be very useful in assigning responsibility. Key-centric approaches also require a homogeneous environment if delegation is to be transitive. By contrast, identifying and distinguishing between entities in a chain of delegations allows both delegation between heterogeneous systems and persistent delegation, as explained in the description of the present invention below.

The concept of authentication is related to the concept of delegation. For instance, one way for a task A to delegate rights to a task B is for A to provide B with authentication information that allows B to impersonate A. This approach to delegation is relatively easy to implement but it also has serious disadvantages. Task B receives all rights of task A, including rights B does not necessarily need to perform the job at hand. Moreover, giving two tasks the same identity makes it harder to assign responsibility for inept or malicious acts which are performed under that identity.

A detailed approach to authentication in a distributed computing system is described in Network Working Group Request for Comments 1507 ("RFC 1507"), entitled "DASS: Distributed Authentication Security Service". As stated in RFC 1507, "the goal of authentication is to reliably learn the name of the originator of a message or request. The classic way by which people authenticate to computers (and by which computers authenticate to one another) is by supplying a password. There are a number of problems with existing password based schemes which DASS attempts to solve. The goal of DASS is to provide authentication services in a distributed environment which are both more secure (more difficult for a bad guy to impersonate a good guy) and easier to use than existing mechanisms. In a distributed environment, authentication is particularly challenging. Users do not simply log on to one machine and use resources there. Users start processes on one machine which may request services on another. In some cases, the second system must request services from a third system on behalf of the user. Further, given current network technology, it is fairly easy to eavesdrop on conversations between computers and pick up any passwords that might be going by. DASS uses cryptographic mechanisms to provide 'strong, mutual' authentication. Mutual authentication means that the two parties communicating each reliably learn the name of the other. Strong authentication means that in the exchange neither obtains any information that it could use to impersonate the other to a third party."

DASS operates by providing a global identity which allows a user to log into a network instead of requiring separate logins for each server. The user is assigned a name from a global namespace and that name will be recognized by any node in the network. A resource may be configured for access only by a particular user through a particular node, but the user is still known by the given global identity.

It would be an advancement in the art to provide an improved distributed computing system delegation service which expressly identifies the entities involved in a delegation of rights but does not require a global namespace.

It would be a further advancement to provide such an improved service which supports delegation across network boundaries.

It would also be an advance to provide such an improved service which is compatible with existing public key infrastructures and existing authentication tools and techniques.

Such delegation improvements are disclosed and claimed herein.

BRIEF SUMMARY OF THE INVENTION

The present invention provides Distributed Deputization Points for use in a distributed computing system. Deputization is a particular type of rights delegation which expressly identifies the entities involved in the delegation and does not inherently require a global namespace. "Rights" are sometimes referred to in connection with "permissions"; the two terms are used interchangeably herein. In one embodiment, the invention operates as follows.

A user logs in and sends an authentication request to one of the Distributed Deputization Points ("DDPs"). The "user" may be a user task for a human who is using the system, or it may be a system task which is created by the system software or by some application program. Login might be unnecessary for system tasks. The authentication request identifies the user by a user name, a user ID number, or the like. Familiar or novel authentication mechanisms may be used, including biometric readings, a smart card, and so on. The authentication request may include a logon certificate, a password, or another credential to prove that the user has the right to operate under the specified user name or user ID.

Assuming the credential and/or other authentication information is accepted by the DDP as legitimate, the user receives an authentication response. The authentication response includes an indication that the user is now authenticated, and may also include a credential identifying the permissions granted to the user as a result of the authentication. As noted, tasks created by the distributed computing system may also authenticate themselves to a DDP. In particular, deputized agents previously created by or on behalf of a DDP can in turn authenticate themselves to the same or another DDP in order to create additional deputies.

The authenticated user then sends the DDP a deputy credential request. The deputy credential request may contain the public key of the proposed deputy, or it may identify the deputy so the DDP can request the deputy's public key from a repository in a public key infrastructure. Alternatively, the DDP may be responsible for seeing that a deputy is created and for obtaining the identity of the deputy from the operating system. When the user identifies the deputy, the deputy credential request also contains the private key of the proposed deputy encrypted with the user's public key and a user credential which identifies the user and proves it is authorized to create deputies.

The maximum life span of the deputization or another expiration event may also be provided to the DDP by the user, or the DDP may use a default event or even override the event requested by the user. In some versions, no maximum life span or other predefined expiration event is specified and each right granted through a deputization is recognized until it is expressly revoked.

The permissions to be granted to the deputy may be specified to the DDP by the user. These permissions must be the same as, or a proper subset of, the permissions held by the user. The DDP can be configured to override the permissions requested by the user if system administrators determine that is appropriate. If the deputy credential request does not specify the deputy permissions, the DDP may use a default value or simply make the permissions the same as the user's.

In response to the deputy credential request, the DDP creates a deputy credential. The deputy credential contains the user identity, permissions being delegated by the user, the private key of the deputy encrypted with the user's public key, a deputy certificate, and the DDP's digital signature. The deputy certificate contains the public key of the deputy in a certificate minted by the DDP or some other well-known DDP, deputy credentials from the DDP, deputy permissions, and the DDP's digital signature. The deputy certificate may also contain a maximum deputy certificate life span that indicates when the deputization expires. Passage of time is not the only event that can trigger an expiration. Other deputization expiration events include, for instance, decommissioning an employee through the Human Resources department, an explicit or forced expiration by an administrator, or a database corruption event.

A user may have zero or more deputies, and each deputy may have zero or more individually deputized functions or deputies. Including the user identity in the deputy credential ensures that the user can be held responsible for the activities of its deputies. Including the private key of the deputy encrypted with the user's public key allows the user to sign deputized functions in a way that makes it possible to trace the actions of both a particular user and a particular deputy in order to hold the correct party responsible for the activities of a given deputized function. The DDP signatures make it possible to hold the DDP involved responsible, and also make it possible to detect alterations in the deputy certificate and/or the deputy credential after the credential and certificate are provided by the DDP. The deputy permissions specify what the deputy can and cannot do, and the deputy credentials show that the permissions are accurate.

The user can deputize functions with the deputy credential. Each deputized function includes some code or script to run, the deputy certificate, and a signature created using the deputy's private key (which is known to the user). A deputized function may also specify which permissions are being granted. Permission specification is not needed if the deputized function is going to run under the domain of the deputy, that is, with the same permissions as the deputy. Otherwise, the deputized function becomes a deputy itself and must be authenticated at the target with a deputy credential which specifies the permissions. Any access point that can authenticate the deputy certificate can authenticate the deputized function, allowing it the permissions specified in the deputy certificate. Multiple deputy certificates can be associated with a single deputized function or other deputy, in which case the permissions allowed are the union of the permissions in whatever individual deputy certificates are authenticated.

Unlike key-oriented approaches to delegation, deputization associates particular acts of delegation with particular entities and does not require a global namespace. Creating deputies in this manner has several advantages. Entities responsible for particular actions can be more readily identified. A delegation of authority can be made to persist even after the entity which delegated the authority logs off the system, since the deputy can persist. Delegations can also be made from one namespace to another, and across heterogeneous network boundaries, by creating deputies in the target namespace and/or network. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
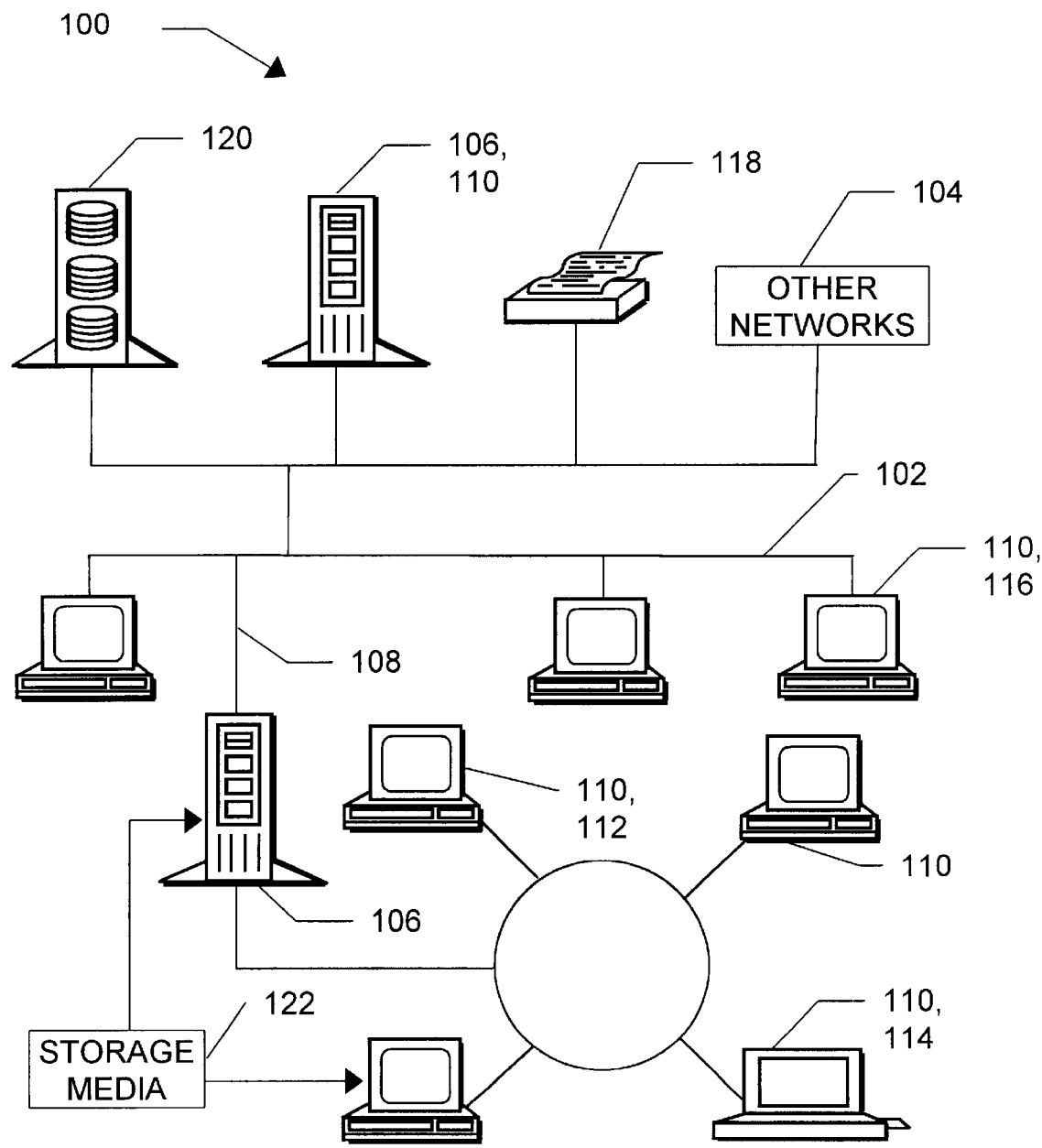
FIG. 1 is a diagram illustrating one of the many distributed computing systems suitable for use according to the present invention.

The present invention relates to methods, systems, signals, and devices for delegating rights in a computer network or other distributed computing system. In particular, the invention provides and uses tools and techniques for delegating rights through deputization. Various components of the invention and its environment are discussed below.

Overview of the Invention

Deputization is a particular type of rights delegation. Deputization provides secure delegation in distributed computing environments which include one or more computer networks, including environments which support a "network login" instead of requiring a user to log in separately to each network server.

Unlike some other approaches to delegation, deputization is not key-centric. Entity identifiers such as distinguished names are used together with cryptographic keys to make secure delegations. Through deputization, rights are delegated from one identified entity to another identified entity. Deputization does not require that one entity impersonate another entity.

Using deputies which have their own identities allows the present invention to delegate rights across boundaries such as the boundary between two namespaces and/or two networks. A chain or tree of deputies can also be created, since a deputy can delegate rights to other deputies.

The deputies are trusted because they have certificates or credentials which are digitally signed by a known and trusted Distributed Deputization Point ("DDP"). A deputy operating through deputy credentials can create other deputies using the same or different DDPs. This allows one or a few initial deputies to cover significant territory by creating other deputies from a pool of known DDPs and sending these deputies out to perform some distributed task such as a computation or a database query. For example, suppose a task can be performed only within certain hours of the day. A pool of known DDPs is located using a directory service such as Novell Directory Services or a Lightweight Directory Access Protocol service, for instance. The pool lists the DDPs and their operating hours. The user deputizes an initial agent, which waits until the DDP pool is operational and then deputizes other agents via the DDPs to perform the task.

Deputization according to the invention does not require a global namespace, although it may use one. For instance, deputies can log onto a system described by the Distributed Authentication Security Service. A namespace that is managed by a distributed directory using NDS, LDAP or other means can use a DDP to create a deputy credential which is acceptable to one or more other namespaces. Thus, it is not necessary that the initial principal be globally known in every namespace that ultimately contains a deputy in that principal's deputization tree. Each deputy can create or receive its own identity before receiving the rights and permissions stated in the deputy credential, if the DDP knows about the node to be logged onto and the new deputy ID is available on the target system.

Providing deputies with separate identities also allows deputies to live on after the user session is over. A deputy of a deputy may likewise live on after the first deputy finishes. Other aspects of the invention are described below.

Computers, and Networks Generally

Distributed computing systems which may be configured according to the invention include computer networks, both individually and in aggregations, as well as mobile computers which are connectable to such networks. By way of example, suitable computer networks include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, wide-area networks, Internet servers and clients, intranet servers and clients, or a combination thereof.

One of the many computer networks suited for use with the present invention is indicated generally at 100 in FIG. 1. In one embodiment, the system 100 includes Novell NetWare® network operating system software (NOVELL and NETWARE are registered trademarks of Novell, Inc.). In alternative embodiments, the system 100 includes NetWare Connect Services, VINES, Windows NT, Windows 95, Windows 2000, LAN Manager, or LANtastic network operating system software and/or an implementation of a distributed hierarchical partitioned object database according to the X.500 protocol such as Novell Directory Services or Lightweight Directory Access Protocol ("LDAP") directory services (NOVELL DIRECTORY SERVICES is a registered trademark of Novell, Inc.; VINES is a trademark of Banyan Systems; NT, WINDOWS 95, WINDOWS 2000, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several file or object servers 106 that are connected by network signal lines 108 to one or more network clients 110. The servers 106 and clients 110 may be configured by those of skill in the art in a wide variety of ways to operate according to the present invention. The servers 106 may be configured as Internet servers, as intranet servers, as directory service providers or name servers, as software component (e.g., COM or Java) or other object servers, or as a combination thereof. The servers 106 may be uniprocessor or multiprocessor machines. The servers 106 and clients 110 each include an addressable storage medium such as random access memory and/or a nonvolatile storage medium such as a magnetic or optical disk.

Suitable network clients 110 include, without limitation, personal computers 112, laptops 114, workstations 116, dumb terminals, information appliances, personal digital assistants, and other handheld and/or embedded processing systems. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

In addition to the network client computers 110, a printer 118 and an array of disks 120 are also attached to the particular system 100 shown, as examples of other network nodes or devices. A given computer may function both as a client 110 and as a server 106; this may occur, for instance, on computers running Microsoft Windows NT or Windows 2000 software. Although particular individual and network computer systems and components are shown, those of skill in the art will appreciate that the present invention also works with a variety of other networks and computers.

The servers 106 and the clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or network clients 110 to perform deputization and other steps of the present invention substantially as described herein.

Data Flow Generally

Figure 2:
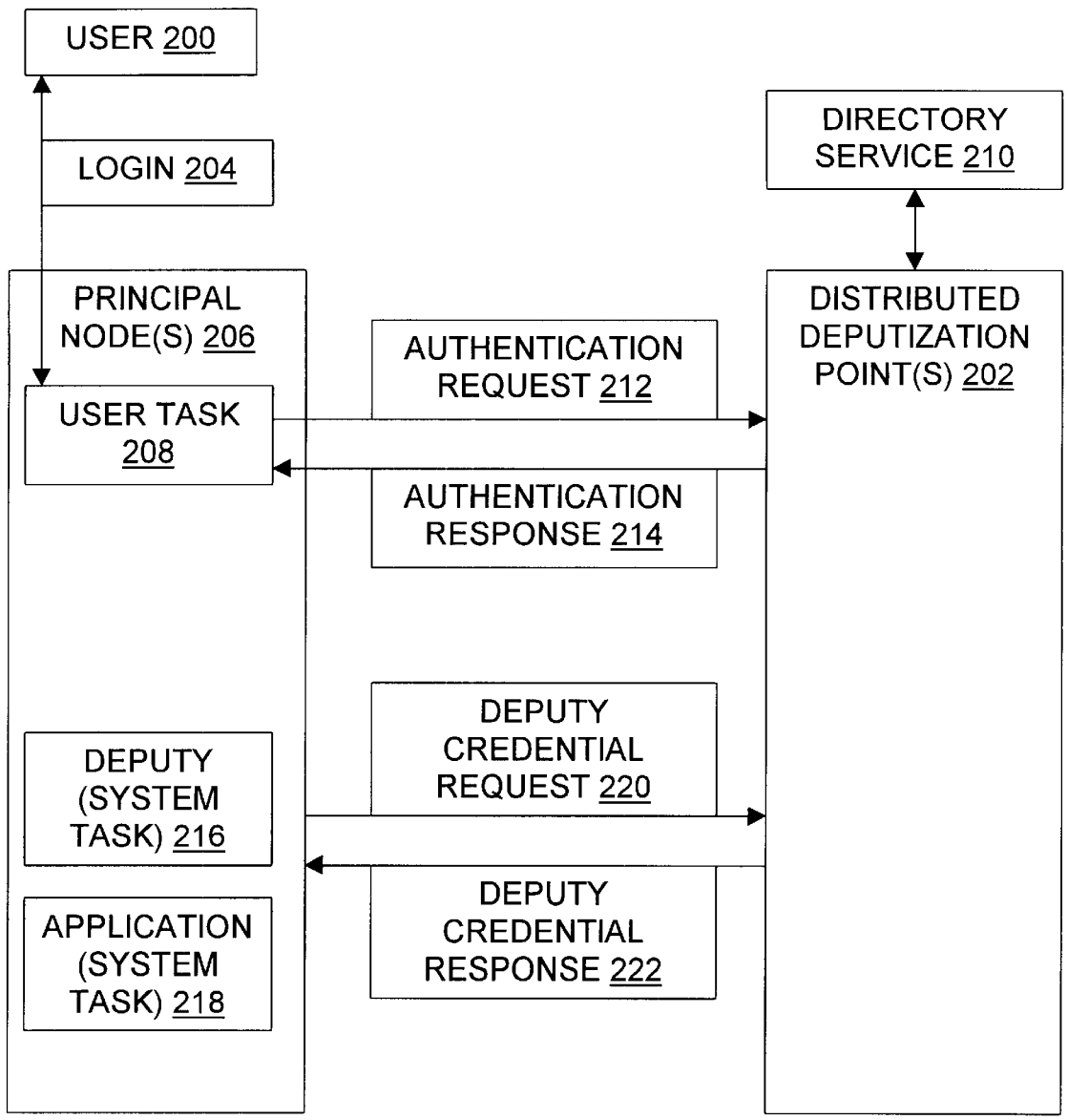
FIG. 2 is a data flow diagram illustrating selected components of the inventive distributed computing system and information communicated between those components.

FIG. 2 illustrates generally the flow of data in a distributed computing system such as the system 100 during a deputization according to the invention. A user 200 wishes to be authenticated to a distributed deputization point 202 in order to delegate rights to one or more deputies. The user 200 first logs into the system 100 by exchanging login information 204 with a server 106. The server 106 will act as a principal node 206, that is, as a node 206 which represents a principal (one who delegates rights). The login information 204 exchange may be automatic if the user 200 is already logged into a client 110 that communicates with the principal node 206, or it may be done expressly at the user's request.

A user task 208 on the principal node 206 represents the user 200 for delegation purposes. The user task 208 is one example of a principal; other examples discussed below include tasks created by other software running on the system 100.

The user task 208 locates the distributed deputization point 202 using a directory service 210 or other means, and then sends the DDP 202 an authentication request 212. The authentication request 212 identifies the user 200 by a username, a user ID number, or other identifier. The authentication request 212 may include a logon certificate, a password, or another credential to prove that the user 200 has the right to log onto the system 100 under the specified user name or user ID. Suitable authentication mechanisms include biometrics, smart cards, and other authentication tools and techniques known to those of skill in the art.

The distributed deputization point 202 checks the authentication request 212 and either recognizes or refuses to recognize the user task 208 as authentic. If recognition is refused, error messages may be sent to a network or system administrator, a log entry may be made, and other steps familiar to those of skill in the art may be taken to inform the user 200 and/or system administrators as appropriate.

Assume that the authentication request 212 is accepted by the distributed deputizing point 202 as legitimate. The DDP 202 then sends the user an authentication response 214. The authentication response 214 includes an indication that the user 200 is now authenticated, and may also include a credential identifying the permissions granted to the user 200 as a result of the authentication. Such a credential is not necessary, but merely provides one way to authenticate the user task 208 to the DDP 202 and to maintain that authentication. Authentication information may also be maintained in the DDP 202 or in some system data structure accessible to the DDP 202.

As noted above, principals may be user tasks 208, or they may be other tasks. For instance, a task created by an operating system, by an application program, or by other software may also act as a principal by using the DDP 202 to delegate rights to deputies. In particular, a deputy 216 which was previously created according to the invention may be a principal that creates its own deputies. Likewise, an application program 218 may use the DDP 202 to create deputies. User tasks 208, deputies 216, and applications 218 are collectively referred to herein as "principals". In some cases, deputies 216 and/or applications 218 may already be authenticated to the DDP 202, making an authentication request 212 and corresponding response 214 unnecessary.

In any case, the principal 208, 216, or 218 sends the DDP 202 a deputy credential request 220. The deputy credential request 220 either contains the public key of the proposed deputy, or identifies the deputy so the DDP 202 can request the deputy's public key from a repository, or presumes that the DDP 202 will obtain the deputy identity after creating the deputy. The repository may be part of a familiar public key infrastructure, and certification authorities of the type familiar in the art may be used. If the deputy's public key is provided, then the deputy credential request 220 also contains the private key of the proposed deputy encrypted with the user's public key. In addition, the request 220 identifies the principal and proves that the principal is authorized to create deputies.

The maximum life span of the deputization may also be provided to the DDP 202 by the principal. Alternatively, the DDP 202 may use a default value, or it may override the value requested by the principal. In some embodiments, no maximum life span is specified, and deputizations are good until expressly revoked.

The permissions to be granted to the deputy by the principal may also be specified to the DDP 202 by the principal. These permissions must be the same as, or a proper subset of, the permissions currently held by the principal. Alternatively, the request 220 need not specify the deputy permissions, in which case the DDP 202 can use a default value or can simply make the permissions the same as the principal's.

In response to the deputy credential request 220, the DDP 202 creates a deputy credential and/or deputy certificate. Deputy credentials and certificates are discussed in detail in connection with FIG. 6. In general, a deputy credential contains the principal's identity, the permissions being delegated to the deputy by the principal, the deputy's private key encrypted with the principal's public key, and the digital signature of the DDP 202. A deputy certificate contains information such as the deputy's public key, the rights granted, and the life span of the certificate.

Once a principal has a deputy certificate, it can use that certificate to deputize individual functions, agents, and/or other entities as deputies. Any access point in any network in the system 100 which can authenticate the deputy certificate can then authenticate the deputy to permit access to network resources in accordance with the rights and permissions granted in the deputy certificate. Multiple deputy certificates from one or more principals may be used to provide aggregate access and permission lists, so long as each deputy certificate can be authenticated by the site in question.

As a result, deputies of a principal can be given certain access and permission to network resources without the principal being present to authenticate all their requests. Requests made using a deputy certificate are as good as requests made by the principal itself, so long as the deputization has not expired or been revoked.

Deputization Chains and Trees

Figure 3:
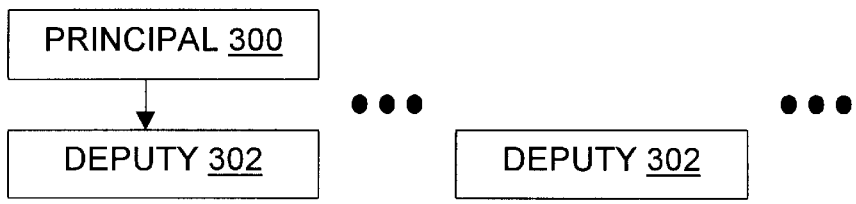
FIG. 3 is a diagram illustrating a principal, a deputy of the principal according to the invention, and the relative persistence of the principal and the deputy over time.
Figure 4:
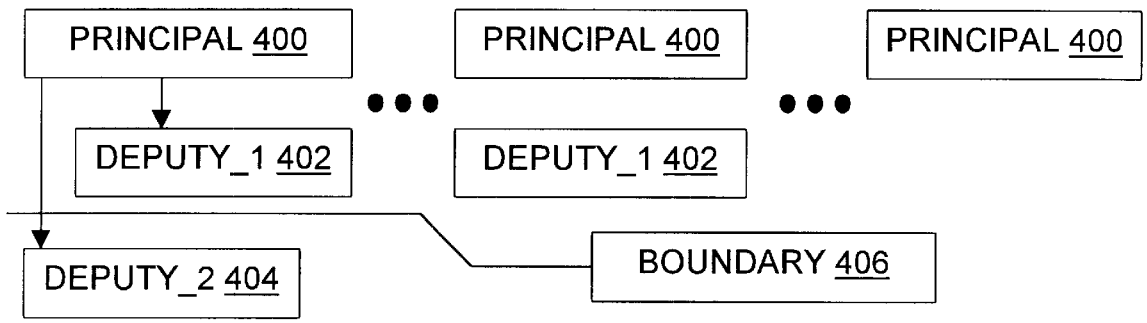
FIG. 4 is a diagram illustrating a principal, two deputies of the principal according to the invention, the relative persistence of the principal and the deputies over time, and a boundary such as a boundary between namespaces and/or networks.
Figure 5:
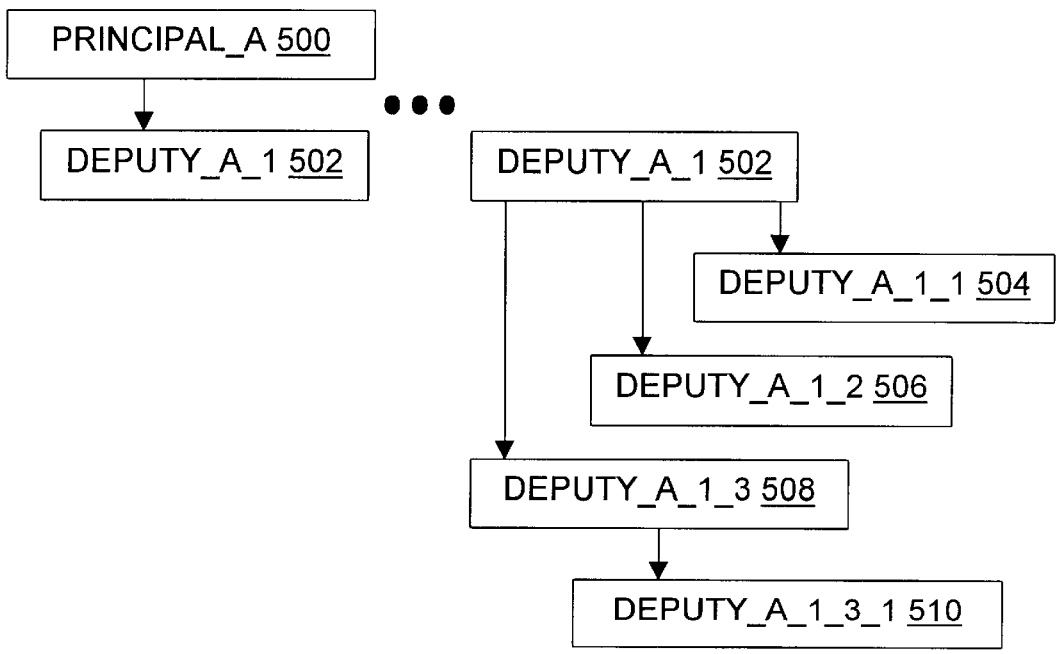
FIG. 5 is a diagram illustrating a principal, a deputy deputized directly by the principal according to the invention, and several deputies in a tree of deputies which have been directly or indirectly delegated rights from the principal according to the invention.

FIGS. 3 through 5 show a few of the many possible configurations of principals and deputies which are possible according to the present invention. FIG. 3 illustrates a relatively simple configuration, in which one principal 300 uses a distributed deputization point to delegate rights to one deputy 302. This is shown in the leftmost column of FIG. 3. Because the deputy 302 has an identity separate from that of the principal 300, the deputy 302 can persist even after the principal 300 is no longer present on the system. This is indicated in the center column of FIG. 3, with the passage of time being indicated by the ellipsis between the columns. As shown in a third, rightmost column which contains neither the principal 300 nor the deputy 302, the deputy 302 can subsequently terminate itself once it has performed the task assigned to it.

FIG. 4 illustrates a more complex configuration. A principal 400 delegates rights to two different deputies 402, 404. The two deputies 402, 404 may receive the same rights or they may receive different rights, depending on the circumstances. Several deputies of a given principal may all operate in a homogeneous region such as a given namespace and/or network. However, as indicated by a boundary marker 406 in the Figure, different deputies of a given principal may also operate in different regions. FIG. 4 also illustrates the fact that deputies do not necessarily outlive their principal. As shown, the principal 400 and the first deputy 402 outlive the second deputy 404, and the principal 400 continues operating on the system even after the first deputy 402 expires, terminates itself, is terminated, or otherwise stops executing.

FIG. 5 illustrates a configuration in which a deputy also serves as a principal. Thus, a principal 500 delegates rights to a first deputy 502. After the principal 500 exits the system, the first deputy acts as a principal by delegating rights to three additional deputies 504, 506, 508. The last deputy 508 in turn delegates rights to another deputy 510. The collection which includes the principal 500 and the deputies 502, 508, and 510 is an example of a deputization chain. The entire illustrated configuration, containing the principal 500 and the deputies 502 through 510, is an example of a deputization tree.

Of course, those of skill in the art will appreciate that many, many other configurations are possible using the invention. In particular, more or fewer principals, deputies, and/or boundaries may be present in a given configuration under the invention. Relative life spans of principals and deputies may also differ from those shown, and differently sized and shaped deputization chains and trees may occur.

Deputization Signals Generally

Figure 6:
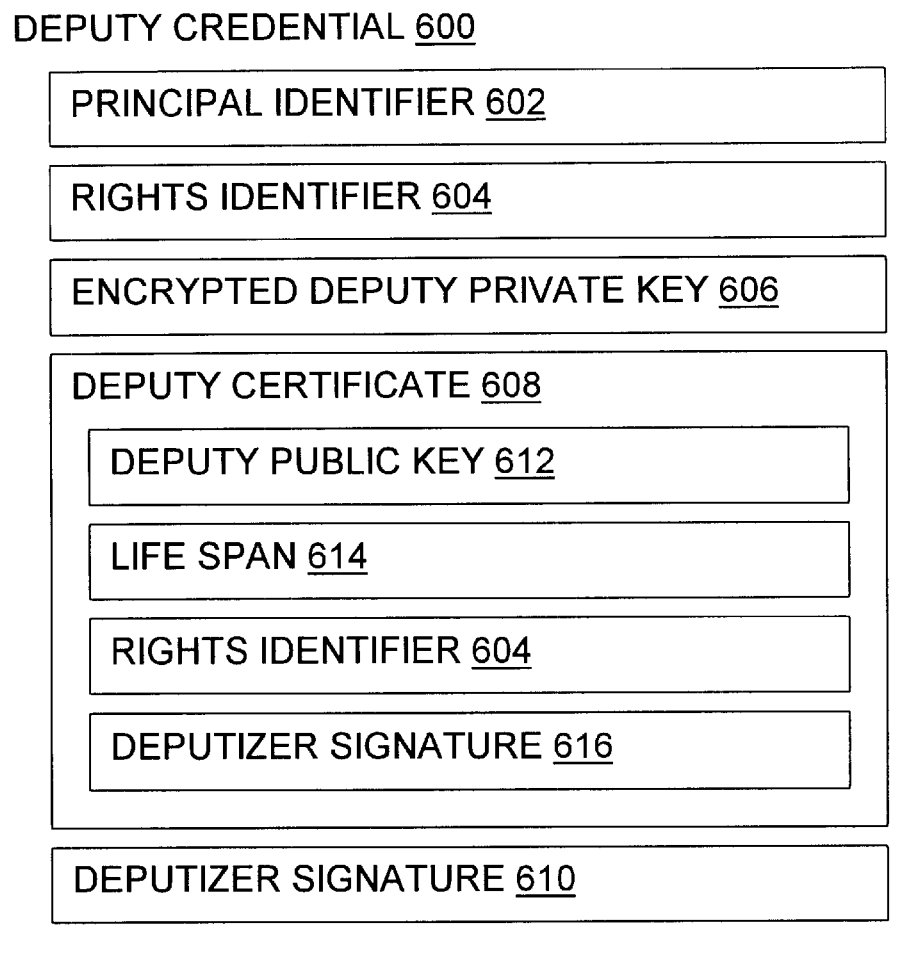
FIG. 6 is a diagram illustrating the structure of a deputy credential signal according of the present invention.
Figure 7:
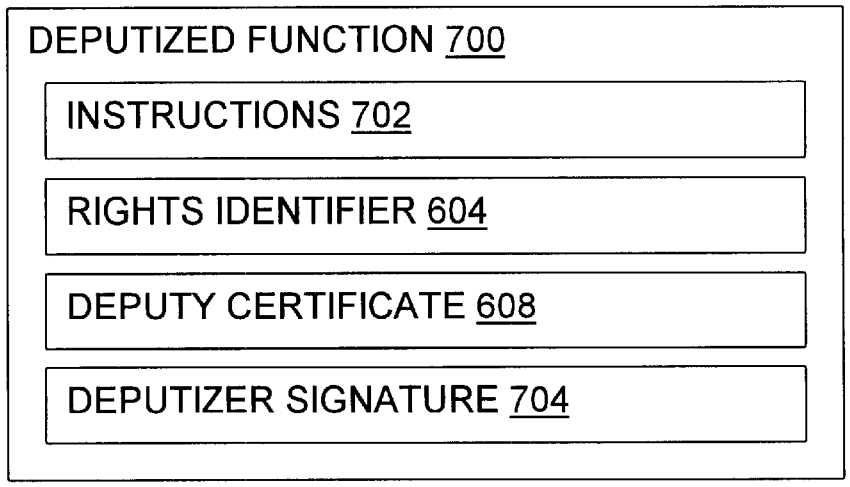
FIG. 7 is a diagram illustrating the structure of a deputized function signal according to the present invention.

FIGS. 6 and 7 illustrate deputization signals according to the present invention. A deputy credential 600 is created by a distributed deputization point 202 in response to a request by a principal, as noted above in connection with FIG. 2. The deputy credential 600 includes a principal identifier 602 which identifies the principal that will delegate rights through the deputy credential 600. The principal identifier 602 may include a distinguished name, tuned name, GUID or UUID, uniform resource locator, network address, user name, user ID number, account number, and/or other identification. Unlike key-centric systems, a mere public key is not sufficient identification of the entity which is delegating rights.

The rights which the principal has actually delegated are identified in a rights identifier 604. As noted earlier, the distributed deputization point 202 may delegate all of the rights specified by the principal's request 220, or the distributed deputization point 202 may partially or entirely override that request. The rights identifier 604 may be implemented using bit flags, groups, permissions, access control lists, security labels, clearance levels, and/or other familiar identifications of resource access rights.

The deputy credential 600 also includes as a component 606 the private key of the deputy encrypted with the public key of the principal. Any reliable public key mechanism may be used, including without limitation those described in Schneier, *Applied Cryptography*, ISBN 0-471-59756-2 (1994), and other reference works on public key cryptography.

A deputy certificate 608 in the deputy credential 600 contains additional components, including a public key 612 of the deputy and a life span 614. The life span 614, which is optional, may be used to define the time period over which the delegation of rights memorialized in the deputy credential 600 is valid. Tools and techniques for implementing "total time to live" and other life span components in other contexts (such as in connection with conventional certificates in a public key infrastructure) are familiar to those of skill in the art.

The rights identifier 604 may be repeated in the deputy certificate 608. Repetition may be helpful in an embodiment in which the DDP 202 maintains authentication state in the credential 600. In such cases, the credential 600 is required to authenticate an access request by the deputy and the certificate may be used in one or more other deputizations, for instance. It is also possible to have a credential 600 authenticate the deputy but have all rights and permissions specified at the DDP 202 rather than in the credential 600. As illustrated in FIG. 7, repetition of components may also be appropriate to allow use of the deputy certificate 608 apart from the deputy credential 600.

The deputy certificate 608 and the deputy credential 600 are digitally signed by components 616, 610, respectively, which are digital signatures based on the other contents of the certificate 608 and the other contents of the credential 600, respectively. The digital signatures 616, 610 are created by the distributed deputization point 202 when it creates the certificate 608 and/or credential 600, respectively. Any of a wide variety of familiar digital signature tools and techniques may be used.

FIG. 7 illustrates a deputized function signal 700. The deputized function 700 includes instructions 702 for performing some task on behalf of the principal which delegated rights to the function. The term "instructions" is used broadly, to include computer controlling, informing, and/or recording means such as executable code and data, portable byte codes, scripts, dynamic link libraries, forms, graphics, and/or other code and data needed to perform tasks. The rights delegated are identified in a rights identifier 604 and/or a deputy certificate 608. The instructions 702 and the other components are signed by the distributed deputization point 202 with a signature 704, which is generated in a manner similar to the deputizer signatures 610, 616.

Those of skill in the art will appreciate that the signals 600, 700 may be implemented in data structures in various ways. For instance, signal components may be placed in a different order from that shown in the Figures, may be omitted (unless called for in the appended claims), and may be supplemented with other components such as error detection and correction codes, timestamps, and/or network addresses. A wide variety of data structure field sizes and data encodings are possible. The deputization signals may also be embodied in the system 100 in various media. For instance, they may take the form of data structures stored on a disk or in RAM memory, and/or the form of signals on one or more network communication lines 108.

Methods Generally

Figure 8:
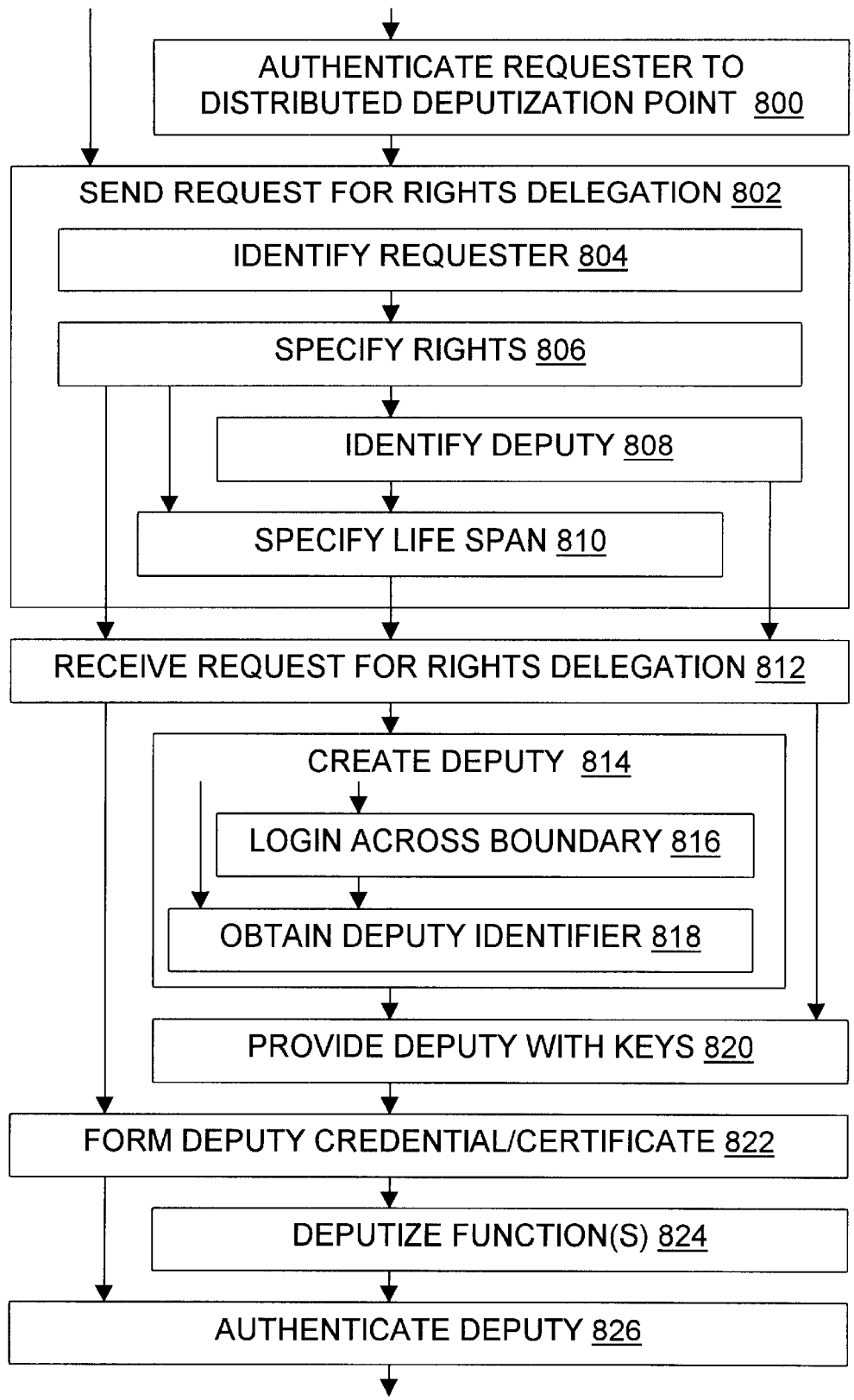
FIG. 8 is a flowchart illustrating several methods of the present invention for delegating rights through deputization in a distributed computing system.

FIG. 8 illustrates methods according to the present invention. Those of skill in the art will appreciate that the method steps may be implemented and performed in various ways. For instance, steps may be performed concurrently and/or in a different order from that shown, except to the extent that one step requires the results of another step. Steps may also be omitted (unless called for in the claims), and may be supplemented with other steps such as error detection and correction steps, notification and logging steps, and steps which are directed to performing assigned tasks once the deputy or deputies are authenticated. Finally, steps may be repeated. In particular, a given principal may delegate rights to several deputies and/or a deputy may delegate rights, as shown in FIGS. 4 and 5, by appropriate repetition of selected steps.

During an authenticating step 800, a principal authenticates itself to one or more distributed deputization points 202. This may be performed as discussed above in connection with the authentication request 212 and authentication response 214. As noted in that discussion, some principals may already be authenticated to the DDP 202 and/or may be pre-authorized under the system so that no authentication step 800 is needed.

A request sending step 802 sends to one or more DDPs 202 one or more requests for rights delegation through deputization. This may be done by transmitting deputy credential requests 220. In particular, the sending step 802 includes a step 804 identifying the requester and a step 806 specifying the rights to be delegated. Suitable data for the steps 804, 806 are discussed above in connection with deputization signal components 602, 604, respectively.

An optional deputy identifying step 808 identifies the deputy to the DDP 202. This step is suitable when the principal wishes to delegate rights to an existing entity. The step 808 may be omitted if the principal wishes to have the DDP 202 spawn new tasks and give them the specified rights. For instance, the principal may desire to deputize entities which are created only after the principal logs off the system, or the principal may wish to deputize entities which are outside the namespace and/or network of the principal but not outside the namespaces and networks available to the DDP 202. In such cases, the deputy identities are not known to the principal, and thus the identifying step 808 is omitted.

A limited life span for one or more of the specified rights, or for the deputy credential 600 and/or deputy certificate 608 as a whole, may be specified by the principal during a step 810. Alternatively, the life span may be specified by the DDP 202, or no life span may be specified.

During a request receiving step 812, one or more DDPs 202 receive the request sent during the step 802. The request identifies the principal and the rights to be delegated. If the principal does not already have a public key and a corresponding private key, it may be prompted at this point to obtain such a key pair, or the DDP 202 may proactively register the principal with a certification authority to obtain a key pair on behalf of the principal. The DDP 202 may itself be a certification authority, that is, it may have certification authority functionality and recognition in addition to the deputization role discussed herein.

If the entity receiving the rights does not already exist, then it is created during a step 814. As noted above, this may involve logging in across a namespace and/or network boundary during a step 816. Regardless, the DDP obtains from the operating system the identifiers of one or more deputy entities during a step 818. During a step 820, each deputy is provided with a public key-private key pair. This may be done by prompting each deputy to obtain such a key pair from a public key infrastructure, or the DDP 202 may obtain or provide the key pairs on behalf of the deputies.

During a forming step 822, the deputy credential and/or deputy certificate is formed. As noted in connection with FIG. 6, the deputy credential identifies the principal, identifies the rights delegated to the deputy by the principal, contains the deputy private key encrypted with the principal public key, contains the deputy public key, and is signed by the distributed deputization point 202. The deputy certificate 608 may be created to group the deputy public key 612 and possibly other components within the deputy credential 600, as discussed in connection with FIGS. 6 and 7.

During an optional function deputizing step 824, deputized functions such as those illustrated and discussed in connection with FIG. 7 may be created.

Finally, the deputy certificate 608, deputized functions 700, and/or deputy credentials 600 are utilized during one or more deputy authenticating steps 826. Any access point in any network which can authenticate based on these various deputization structures 600, 608, 700 can authenticate deputy tasks and functions under the invention. This provides a flexible yet secure mechanism for delegating rights within the distributed computing system 100.

SUMMARY

The present invention provides the ability to delegate rights in a distributed computing system through deputization. Deputization is useful in a variety of situations, including those which require the use of resources that are remote from a user and the user's normal environment. For instance, deputization could be used to perform tasks on a remote supercomputer or to use restricted software which must be run in a specific controlled environment.

Although particular methods (FIG. 8) and signal formats (FIGS. 6 and 7) embodying the present invention are expressly illustrated and described herein, it will be appreciated that apparatus and article embodiments may be formed according to the signals and methods of the present invention. Unless otherwise expressly indicted, the description herein of methods and signals of the present invention therefore extends to corresponding apparatus and articles, and the description of apparatus and articles of the present invention extends likewise to corresponding methods and signals.

As used herein, terms such as "a" and "the" and other designations are inclusive. In particular, in the claims a reference to an item or a step means at least one such element is required, notwithstanding any express reference elsewhere to "at least one" element. When exactly one element is intended, this document will state that requirement expressly.

The invention may be embodied in other specific forms without departing from its essential characteristics. The described embodiments are to be considered in all respects only as illustrative and not restrictive. Headings are for convenience only. Any explanations provided herein of the scientific principals employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A method for delegating rights in a distributed computing system, the method comprising the steps of:

receiving at a deputization point in the system a request from a principal for delegation of at least one right of the principal to at least one deputy, the request identifying the principal and the rights to be delegated, the principal having a public key and a corresponding private key;

creating at least one deputy having an identity which is different from the identity of the principal such that the deputy can persist even after the principal is logged off of the computing system;

providing the deputy with a public key and a corresponding private key; and forming a deputy credential which identifies the principal, identifies the rights delegated to the deputy by the principal, contains the deputy private key encrypted with the principal public key, contains the deputy public key, and is signed by the deputization point;

wherein the deputy is a first deputy and the method further comprises the step of delegating at least one right from the first deputy to a second deputy by conducting delegation steps with the first deputy acting as the principal and the second deputy as the deputy; and wherein the deputization point is a first deputization point, and the step of delegating at least one right from the first deputy to a second deputy utilizes a second deputization point.

2. The method of claim 1, further comprising the step of authenticating the principal to the deputization point prior to forming the deputy credential.

3. The method of claim 1, further comprising the step of using the deputy credential to authenticate the deputy after the principal has logged off the system.

4. The method of claim 1, further comprising the step of deputizing a function using the deputy credential, the function being provided by the principal.

5. The method of claim 1, wherein the distributed computing system includes at least two networks, one of which networks contains the principal, and the step of creating a deputy comprises the steps of:

authenticating to a distributed deputization point which is known by a different network in the distributed computing system, that is, a network other than the network containing the principal; and obtaining a deputy identifier from that distributed deputization point.

6. A distributed computing system supporting deputization, the system comprising:

at least two computers, each having a memory and a processor;

a communications link between the computers;

principal located on one of the computers contained within a first network included within the distributed computing system;

a deputization point located on another of the computers, the principal and the deputization point configured to communicate with one another through the communications link, wherein the deputization point is known by a different network in the distributed computing system, the different network being a network other than the first network containing the principal;

authentication means for authenticating the principal to the deputization point; and deputization means for delegating at least one right of the principal to at least one deputy after the principal is authenticated to the deputization point, wherein the at least one deputy has an identity which is different from the identity of the principal.

7. The distributed computing system of claim 6, wherein the principal is a user task.

8. The distributed computing system of claim 6, wherein the principal is a system task.

9. The distributed computing system of claim 6, wherein the system spans at least two namespaces, the principal is in one namespace, and the deputy is in a second namespace.

10. The distributed computing system of claim 9, wherein at least one of the namespaces is maintained using a distributed directory service.

11. A computer storage medium having a configuration that represents data and instructions which will cause performance of method steps for delegating rights in a distributed computing system, the method comprising the steps of:

authenticating to a deputization point in the system;

requesting that the deputization point delegate at least one right, the request identifying the requester and the rights to be delegated; and delegating the rights to a deputy which has an identity different from the identity of the requester, the delegation being recorded in a deputy credential which identifies the requester, identifies the deputy, identifies the rights delegated, and is signed by the deputization point;

wherein the system spans at least two namespaces, the requester being in one namespace and the deputy being in a second namespace.

12. The configured storage medium of claim 11, further comprising the step of using the deputy credential to authenticate the deputy after the requester has logged off the system.

13. The configured storage medium of claim 11, wherein the requester previously received rights which were delegated to it as a deputy, the rights having been delegated to the requester by previously executed authenticating, requesting, and delegating steps.

14. The configured storage medium of claim 11, wherein the method further comprises the step of specifying an expiration event, upon a subsequent occurrence of which the delegated rights would expire.

15. The configured storage medium of claim 14, wherein the expiration event specifies a life span for the delegated rights.

16. The configured storage medium of claim 11, wherein the method further comprises a step in which the requester deputizes a function using the deputy credential.

17. The configured storage medium of claim 11, wherein at least the requesting and delegating steps are repeated to generate at least three deputies whose rights are directly or indirectly traceable through delegation back to the requester.

18. A distributed computing system supporting deputization, the system comprising:
- at least two computers, each having a memory and a processor;
- a communications link between the computers;
- a principal located on one of the computers;
- a deputization point located on another of the computers, the principal and the deputization point configured to communicate with one another through the communications link;
- authentication means for authenticating the principal to the deputization point; and
- deputization means for delegating at least one right of the principal to at least one deputy after the principal is authenticated to the deputization point;
- wherein the system spans at least two namespaces, the principal is in one namespace, and the deputy is in a second namespace.

* * * * *